(12) United States Patent
Herberthson

(10) Patent No.: US 6,954,404 B2
(45) Date of Patent: Oct. 11, 2005

(54) METHOD FOR DETERMINING POSITION AND VELOCITY OF TARGETS FROM SIGNALS SCATTERED BY THE TARGETS

(75) Inventor: Magnus Herberthson, Linköping (SE)

(73) Assignee: Totalforsvarets Forskningsinstitut, Stockholm (SE)

( * ) Notice: Subject to any disclaimer, the term of this patent is extended or adjusted under 35 U.S.C. 154(b) by 39 days.

(21) Appl. No.: 10/476,492

(22) PCT Filed: May 8, 2002

(86) PCT No.: PCT/SE02/00894

§ 371 (c)(1), (2), (4) Date: Nov. 10, 2003

(87) PCT Pub. No.: WO02/093191

PCT Pub. Date: Nov. 21, 2002

(65) Prior Publication Data

US 2004/0135718 A1 Jul. 15, 2004

(30) Foreign Application Priority Data

May 11, 2001 (SE) ............................................. 0101662

(51) Int. Cl.[7] ............................. G01S 3/80; G01S 13/08
(52) U.S. Cl. ........................ 367/124; 342/59; 342/107; 342/109
(58) Field of Search ................................. 367/118, 124, 367/128, 129; 342/104, 107, 108, 109, 118, 113, 59, 139

(56) References Cited

U.S. PATENT DOCUMENTS

| | | | |
|---|---|---|---|
| 4,318,102 A | * | 3/1982 | Poirier .......................... 342/123 |
| 4,499,468 A | | 2/1985 | Montana et al. .............. 343/15 |
| 5,448,243 A | | 9/1995 | Bethke et al. ................. 342/59 |
| 6,545,633 B1 | * | 4/2003 | Jensen .......................... 342/59 |

FOREIGN PATENT DOCUMENTS

JP    2000-304854    11/2000

* cited by examiner

Primary Examiner—Ian J. Lobo
(74) Attorney, Agent, or Firm—Jacobson Holman PLLC

(57) ABSTRACT

A method for determining position and velocity of targets from signals scattered by the targets using a first and a second station each including a transmitter/receiver of electromagnetic or acoustic signals. First, mono-static measurements are carried out from each station, and also a bi-static measurement between the stations. The two mono-static measurements are used to calculate a number of target candidates with 2-dimensional position and 2-dimensional velocity. These target candidates are tested against the result of the bi-static measurement and the target candidates which are found in all measurements with suitable error margins are retained.

12 Claims, 3 Drawing Sheets

METHOD FOR DETERMINING POSITION AND VELOCITY OF TARGETS FROM SIGNALS SCATTERED BY THE TARGETS

This is a nationalization of PCT/SE02/00894 filed May 8, 2002 and published in English.

BACKGROUND OF THE INVENTION

1. Field of the Invention

The present invention relates to a method for using signals scattered by one or more targets for determining position and velocity of each target. The invention is especially useful in the case where the positions in space and velocity vectors for a very large number of targets are to be determined. The invention is for instance intended for use with the system for determining position and velocity of targets for which this day a patent has been applied with Hans Hellsten as inventor, and which patent application 0101661-7 is hereby incorporated by reference when regarding a more detailed reasoning of the system of transmitter and receiver, henceforth called stations.

2. Description of the Related Art

The invention is based on a 3-dimensional position space and a 3-dimensional velocity space, which together form a 6-dimensional state space with up to $\sim 10^{20}$ cells, where in principle each cell shall be assigned the value 0 (no target) or 1 (target). The large number of cells in the state space place special requirements on the signal-processing method, and one possible method is dealt with in said patent application by Hellsten. In the present patent application an alternative method is suggested.

Due to the large number, $\sim 10^{20}$, of cells in the state space, known projection methods are slow and cumbersome. The simplest known method is where all conceivable target positions are formed for three stations and N targets. They will be fewer than $N^3$ in number, and it is easy to determine position as well as velocity vector for the target for every possible target position. In this way $\sim N^3$ candidates are obtained, each of which Is then supported or discarded by further independent measurements. This gives a method of processing which requires $K N^3$ operations. If K Is large then this method can be much too slow for Interesting values of N.

A specific property of the systems for which the use of the present method is intended is, according to the above, that the information in an introductory, detecting phase can be regarded as binary, which can be utilised. Further the input is from the beginning distributed between different stations. This means that a local, distributed processing which calculates parameters of position and velocity for the targets gives an advantage, as one then receives a paralleling effect on the sensor-near level. A comprehensive communication between stations is then necessary.

The stumbling block is the association problem, which is to in a correct way pair together data from different radar stations. An association where it is unclear whether it is correct or not can be called a candidate. Gradually it becomes clear whether a candidate is a correct association, that is a target, or a false association, sometimes called a ghost. The problem is then to handle the initially very large number of ghosts, that is to find the targets among all candidates.

SUMMARY OF THE INVENTION

The purpose of the present invention is to solve this problem, which is done by the invention according to a method for determining positions and velocities of targets from signals scattered by the targets. The method includes the steps of using first and second stations, each having a transmitter/receiver of electromagnetic or acoustic signals, and carrying out a mono-static measurement from each of these stations as well as a bi-static measurement between the two stations, as initial measurements, the method continues by calculating, from the mono-static measurements, a number of target candidates with two-dimensional position and two-dimensional velocity, testing the target candidates against the bi-static measurement, and retaining those target candidates that are found in all of the measurements with suitable error margins. The calculating takes place in a two-dimensional position space and a two-dimensional velocity space, giving the position and the velocity modulo rotational symmetry around a line through the first and second stations. Use of the rotational symmetry enables conceivable measured target positions in a three-dimensional space, which lie along arcs with a center on the axis of symmetry, to be represented by a point (P(t)) in a half-plane on one side of the axis of symmetry, making a two-dimensional position space, with the velocity being represented by a vector in a two-dimensional velocity space that is in a plane tangent to such point.

According to further embodiments of the present invention, the method may include the further step of establishing the position for a target candidate in a complete three-dimensional position space and three-dimensional velocity space by performing a second set of corresponding measurements and calculations with a third station and either the first station or the second station as a common station. This further step of the method includes, for each calculation, sorting the target candidates according to distance to the common station, and determining, for the distances in both calculations which both contain at least one conceivable target, whether to retain or discard a given candidate as a target based on respective radial velocities from the initial measurements and the second set of measurements.

The method of the present invention may further include the steps of carrying out a third bi-static measurement as between the third station and that station of the first and second stations not being the common station, and retaining or discarding a given candidate as a target depending on agreement between respective radial velocities.

As a further embodiment, the method of the present invention may include the step of placing the stations as grid points in an essentially eguidistant grid on a surface which limits a surveyed position space, a distance d between the grid points being generally equal, and a range of signals with a substantially planar surface being at least 2d. This placement of the stations as grid points results in at least six independent bi-static configurations per grid point, and the range of signals, with a surface that is not substantially planar, is adapted to give the same number of bi-static configurations as with the substantially planar surface.

BRIEF DESCRIPTION OF THE DRAWINGS

The invention will be described in more detail in the following with reference to enclosed drawings, where.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
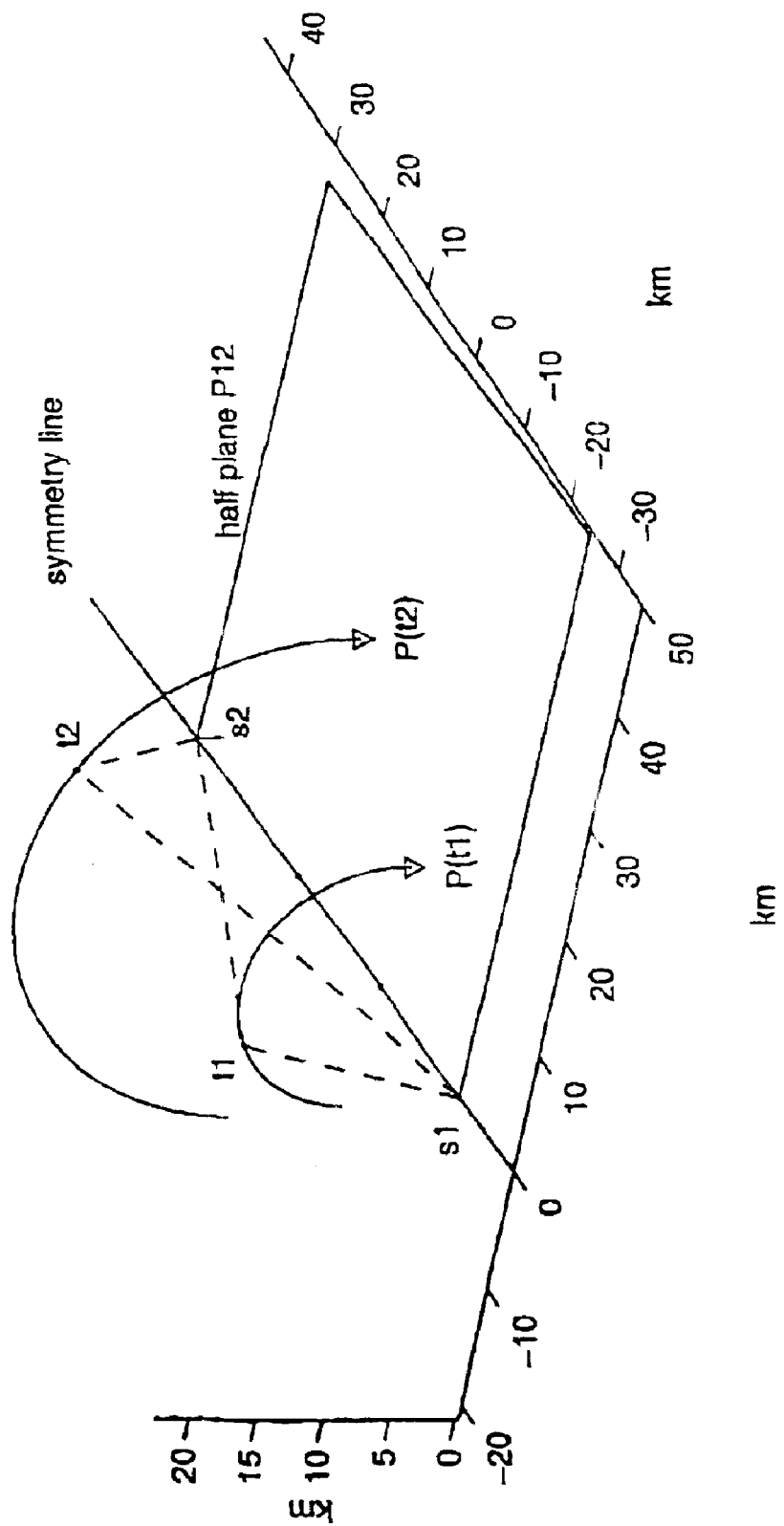
FIG. 1 shows how the geometry around two stations on a plane and how rotation-symmetrical conceivable target positions on measurement from two stations can be transferred to points on a half-plane.

If one studies FIG. 1 with two stations, $s_1$, $s_2$, on the ground, which see one and the same target, $t_1$. In mono-static measurements, one realizes immediately that they place targets along a half-circle in the position space above the ground. Bi-static measurements between the two stations share this symmetry, so that a half-circle can be accepted or discarded in its entirety. For each point on the half-circle, an estimated velocity v is determined up to a line in the velocity space. That is, two stations together ascribe a candidate (target or ghost) a two-surface in the state space. A family of such two-surfaces in the state space form a relatively complicated sub-set in the state space. It is therefore desirable with an introductory calculation where candidates can be represented by points in a reduced state space, rather than by areas. In the case where one studies position as well as velocity, as described above, the reduced state space will consequently be 4-dimensional. Further some type of candidate reduction should occur in this reduced state space, so that the final processing in the full state space becomes simplified.

The basic idea of the invention is to work in low-dimensional, <6, state spaces that are common to several sensors. Optimally the areas in the full state space, corresponding to certain sensor registrations, will be represented by points in the lower-dimensional ditto. As the reduced state space is common to several sensors, one can under certain conditions obtain a sensor-near and local elimination of many ghosts by calculations which are not demanding to process. Such a reduced set of candidates, together with other similarly reduced sets of candidates make up input to a final and complete association in the full state space. This final calculation is then, by the relatively small size of input amounts, also surmountable in terms of processing Intensity.

Figure 2:
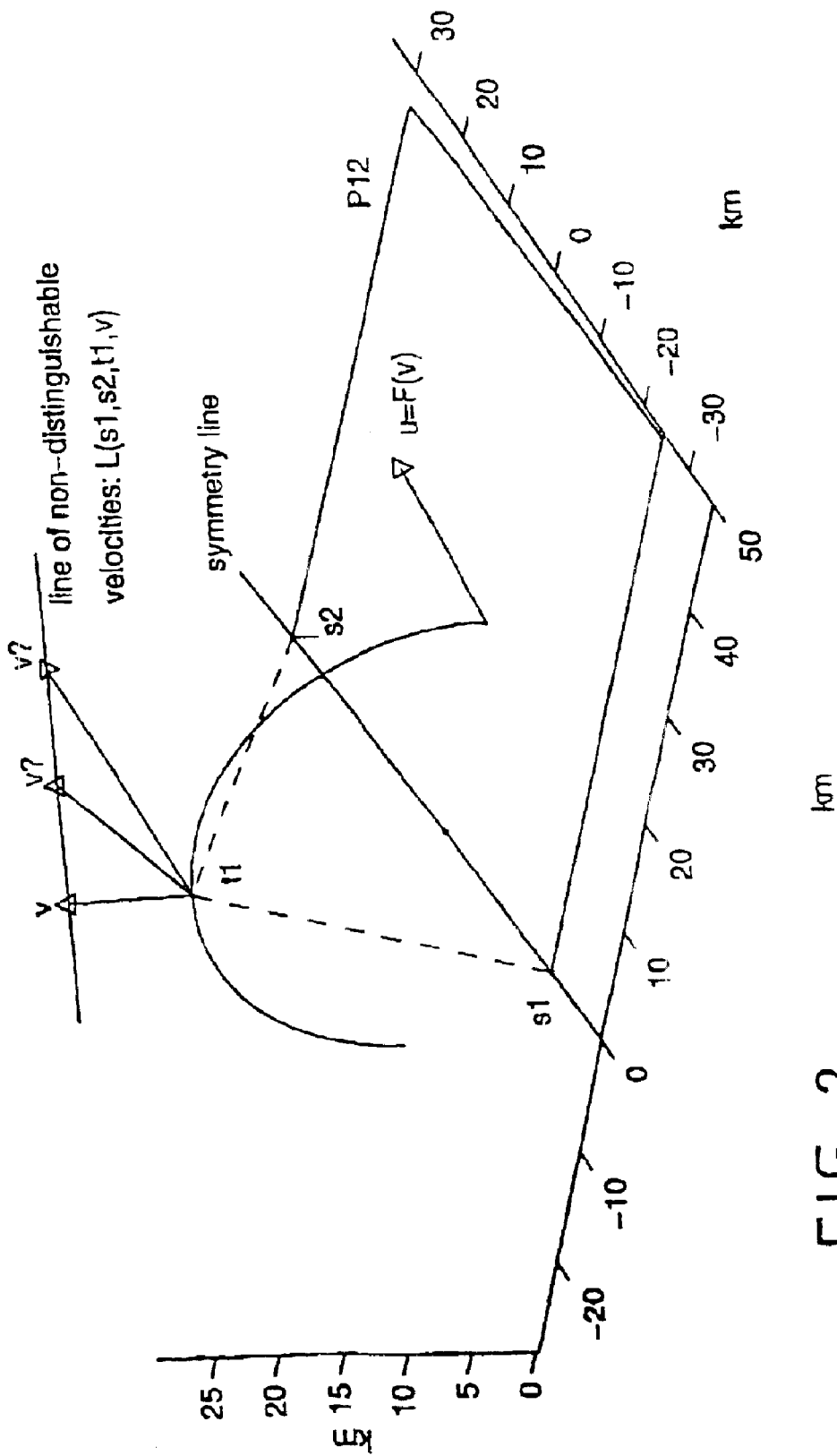
FIG. 2 shows how velocities in a 3-dimensional space can be transferred to non-unique velocities in said half-plane and FIG. 3 shows how one can determine position and velocity by combining measurements from two pairs of stations that have a common station.

From the symmetry in FIGS. 1 and 2 one can see that one can allow the points on the arc corresponding to a candidate $t_1$ be represented by a point $P(t_1)$ in a half-plane $P_{12}$ on one side of the symmetry axis. In FIG. 2 one can see how the velocity v can be determined from mono-static and/or bi-static measurements from a pair of stations by Doppler measurements, except for a component in tangent to the arc direction. This means that the velocity lies on the line $L(s_1,s_2,t_1,v)$. All velocities on this line will be represented by the same 2-dimensional velocity u, which is a vector in the half-plane $P_{12}$. In reverse, it applies that if the velocity in the half-plane $P_{12}$ is known, one knows that the velocity lies on the line $L(s_1,s_2,t_1,u)$, where u is now regarded as the canonic representative of u in three dimensions.

In contrast to the simple problem of finding the common line between measurements from two stations, that is the arc from the Intersection of two (half-)spheres, or the common point between measurements from three stations, that is the point of intersection of three (half-)spheres, the common points from two or three bi-static measurements between the same stations are more complicated to find, as each measurement generates a (half-)ellipsoid with the stations at the focal points. It is more difficult to calculate common points between two ellipsoids than between spheres.

The Invention utilises therefore mono-static measurements between pairs of stations to calculate candidates. It then uses the associated bi-static measurement to eliminate the ghosts. In this way one does not need to calculate common points based on the ellipsoids, but rather looks only at the points where the mono-static measurements indicate that there are candidates and sees whether the bi-static measurements have one or several candidates at the distance in question. This is much simpler than calculating common points from bi-static measurements. In cases where the distance-based analysis does not give sufficient elimination of the number of ghosts, one can use as wall the compiled Doppler information. The Doppler measurements share according to the above the symmetry of the distance measurements and by requiring compatible mono-static and bi-static Doppler measurements a further reduction in the number of ghosts is obtained.

In the following a more detailed description is given of the method in connection with an amount of distributed isotropic transmitters/receivers of electromagnetic of acoustic signals. In the concrete example we consider a number of radar stations. Each radar station sands out a signal that is received by the station itself and also by surrounding neighbours. We refer again to the above-mentioned patent application by Hellsten for a more detailed description of how the system can be embodied in general.

In a first step one uses a first $s_1$ and a second $s_2$ transmitter/receiver of electromagnetic or acoustic signals and carries out mono-static measurements $M_1$ and $M_2$ from each transmitter/receiver, and also a bi-static measurement $B_{12}$ between the stations. First the two mono-static measurements create a number of candidates with 2-dimensional position and 2-dimensional velocity. Then these are tested against the result of the bi-static measurement and the candidates found in all of the measurements with suitable error margins are retained.

In a second step one carries out corresponding calculations with one of the two original stations, say $s_1$, and a third station $s_3$. The same calculations that were carried out for $s_1$ and $s_2$ are carried out for $s_1$ and $s_3$. One then sorts, for each calculation, conceivable targets according to the distance to the common transmitter/receiver, here $s_1$, and determines the distance bins in both calculations that simultaneously contain one or several candidates. For these candidates the radial Doppler velocity in the two measurements is studied, if the difference is smaller than a predetermined value then the candidates are retained; if not then they are discarded.

Figure 3:
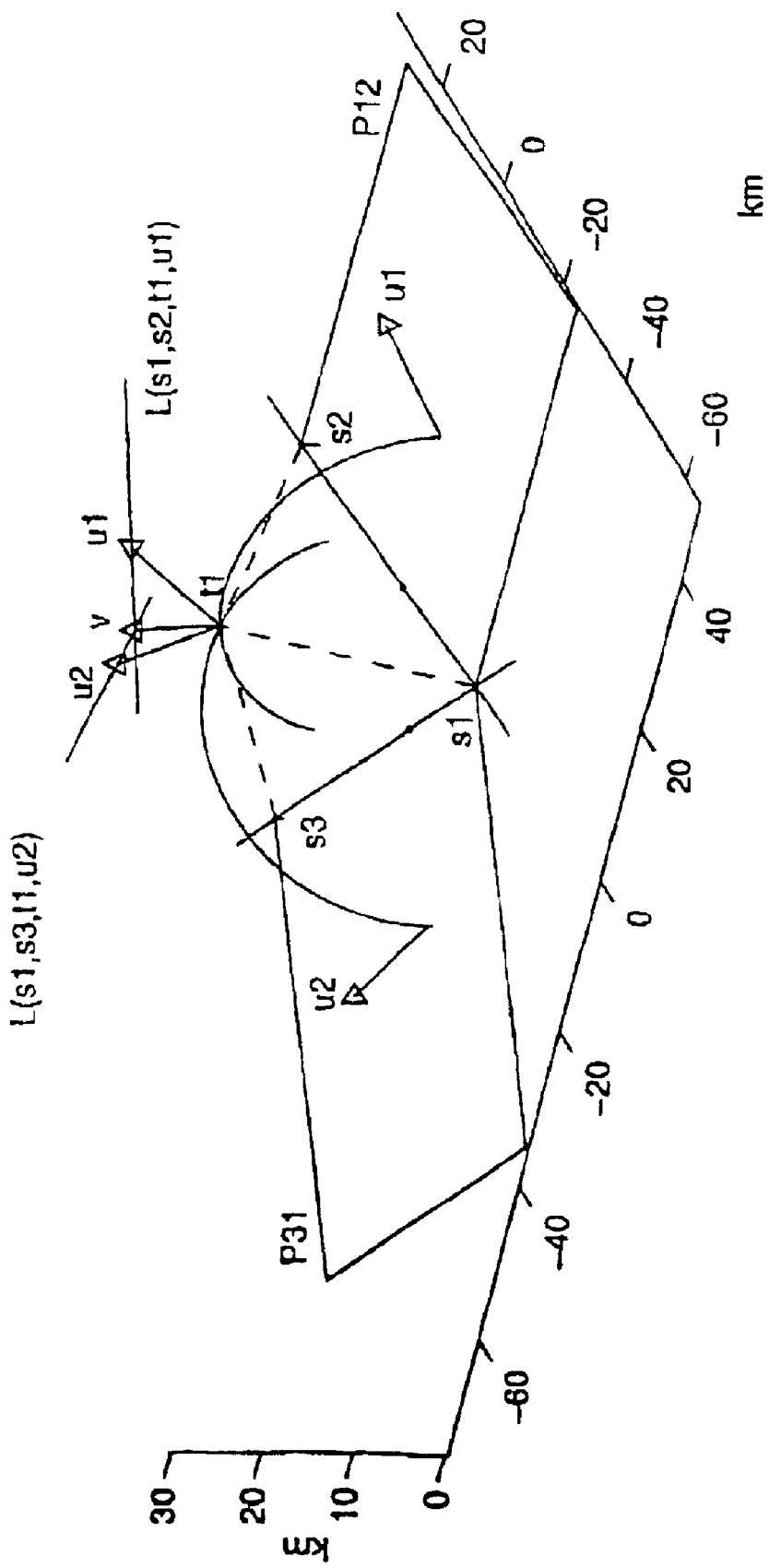

FIG. 3 shows how a target $t_1$ is represented by a point in the half-plane $P_{12}$ and another in the half plane $P_{31}$. The 3-dimensional position is given by the point of intersection of the half-circles. The true velocity v for $t_1$ is represented by the velocity $u_1$, which is a vector in the plane tangent to the point $P(t_1)$ in the half-plane $P_{12}$ and corresponding vector $u_2$ in the half-plane $P_{31}$. Each such velocity can be represented according to the above on a line in the 3-dimensional space. The true velocity v lies In the intersection between these lines $L(s_1,s_2,t_1,u_1)$ and $L(s_1,s_2,t_1,u_2)$.

In a third step one can carry out a third bi-static measurement $B_{23}$ between the two transmitters/receivers, here $s_2$ and $s_3$, which is not the common transmitter/receiver according to the above. The result can be used together with the candidates that remain after step two above to further reduce the number of ghosts.

The local treatment around three stations has through this procedure, with initially paired calculations around two stations and then including all three stations in the calculations, in an elegant way requiring relatively few calculations, given a number of targets and possibly, as a consequence of imperfections in the measurement system and the application of it, some remaining ghosts. It is interesting that in parallel with this, in a larger system, a number of other stations can also have given a number of targets. The parallel handling is very favourable and an absolute pre-requisite according to the above for the processing to be at all possible in a larger system with many stations.

To improve the accuracy in the calculations and discard possible remaining ghosts, one can of course allow further stations, which have a sufficient range, to be included in the calculations. One can consider further mono-static as well as further bi-static calculations.

It has already been mentioned several times that the present invention is intended to be included in a larger system of stations, for example that which is presented in the said patent application by Hans Hellsten. In this application it is stated that a number of stations can be placed as grid points in an essentially equidistant grid on a surface, which limits the surveyed state space, e.g. a ground surface. The idea in the patent application of Hellsten is that the ranges of the stations shall be such that each target is detected on bi-static measurement by at least six independent sets of transmitters and receivers. For this reason the range of the stations is 2d, if the distance between the stations is d, if we consider an essentially planar surface. If the surface is not essentially planar then the ranges must be adapted so that an at least 6-fold bi-static overlap of the surveyed state space is nevertheless achieved.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method for determining positions and velocities of targets from signals scattered by the targets, comprising the steps of:
    using a first station and a second station, each of said stations including a transmitter/receiver of electromagnetic or acoustic signals, and carrying out a mono-static measurement from each of said stations and also carrying out a bi-static measurement between said first and second stations as initial measurements;
    calculating, from said mono-static measurements, a number of target candidates with two-dimensional position and two-dimensional velocity;
    testing said target candidates against said bi-static measurement and retaining those target candidates that are found in all of said measurements with suitable error margins;
    said step of calculating taking place in a two-dimensional position space and a two-dimensional velocity space and giving the position and the velocity modulo rotational symmetry around a line through said first and second stations, use of said rotational symmetry enabling conceivable measured target positions in a three-dimensional space, which lies along arcs with a center on the axis of symmetry, to be represented by a point (P(t)) in a half-plane on one side of the axis of symmetry, making a two-dimensional position space, and said velocity being represented by a vector in a two-dimensional velocity space that is in a plane tangent to said point.

2. The method according to claim 1, further comprising the further step of establishing the position for a target candidate in a complete three-dimensional position space and three-dimensional velocity space by performing a second set of corresponding measurements and calculations with a third station and either said first station or said second station as a common station, said further step including, for each calculation, sorting the target candidates according to distance to said common station, and determining, for the distances in both calculations which both contain at least one conceivable target, whether to retain or discard a given candidate as a target based on respective radial velocities from said initial measurements and said second set of measurements.

3. The method according to claim 2, further comprising the steps of carrying out a third bi-static measurement as between the third station and that station of said first and second stations not being the common station, and retaining or discarding a given candidate as a target depending on agreement between respective radial velocities.

4. The method according to claim 2, further comprising the step of carrying out mono-static and/or bi-static measurements for at least one additional station, and comparing said additional station measurements with earlier measurements.

5. The method according to claim 1, further comprising the step of placing said stations as grid points in an essentially equidistant grid on a surface which limits a surveyed position space, a distance d between said grid points being generally equal, and a range of signals with a substantially planar surface being at least 2d.

6. The method according to claim 5, wherein said step of placing said stations as grid points results in at least six independent bi-static configurations per grid point, and said range of signals, with a surface that is not substantially planar, being adapted to give a same number of bi-static configurations as with said substantially planar surface.

7. A method for determining positions and velocities of targets from signals scattered by the targets, comprising the steps of:
    carrying out a first mono-static measurement from a first station having a first transmitter/receiver of electromagnetic or acoustic signals;
    carrying out a second mono-static measurement from a second station having a second transmitter/receiver of electromagnetic or acoustic signals;
    carrying out a bi-static measurement between said first station and said second station;
    calculating, from said first and second mono-static measurements, a number of target candidates with two-dimensional position and two-dimensional velocity; and
    testing said target candidates against said bi-static measurement and retaining those target candidates found in all of said measurements within an error margin, non-retained target candidates being eliminated as ghost targets.

8. The method according to claim 7, further comprising the steps of:

carrying out a third mono-static measurement from a third station having a third transmitter/receiver of electromagnetic or acoustic signals;

carrying out a second bi-static measurement between said third station and either of said first station or said second station as a common station;

calculating, from said third mono-static measurement and the respective mono-static measurement of said common station, a number of target candidates with two-dimensional position and two-dimensional velocity;

sorting the target candidates according to distance to said common station, and determining, for the distances in both said calculating steps which both contain at least one conceivable target, whether to retain or discard a given candidate as a target based on respective radial velocities from said measurements.

9. The method according to claim 8, further comprising the steps of carrying out a third bi-static measurement as between the third station and that station of said first and second stations not being the common station, and retaining or discarding a given candidate as a target depending on agreement between respective radial velocities.

10. The method according to claim 8, further comprising the step of carrying out mono-static and/or bi-static measurements for at least one additional station, and comparing said additional station measurements with earlier measurements.

11. The method according to claim 7, further comprising the step of placing said stations as grid points in an essentially equidistant grid on a surface which limits a surveyed position space, a distance d between said grid points being generally equal, and a range of signals with a substantially planar surface being at least 2d.

12. The method according to claim 11, wherein said step of placing said stations as grid points results in at least six independent bi-static configurations per grid point, and said range of signals, with a surface that is not substantially planar, being adapted to give a same number of bi-static configurations as with said substantially planar surface.

* * * * *